Aug. 29, 1933.  A. M. ERICKSON  1,924,111
METHOD FOR STEMMING GRAPES
Filed May 24, 1932
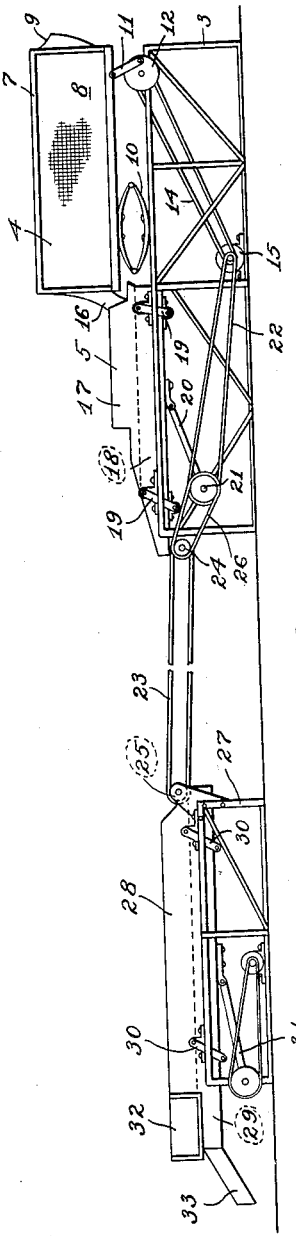
Fig-1-
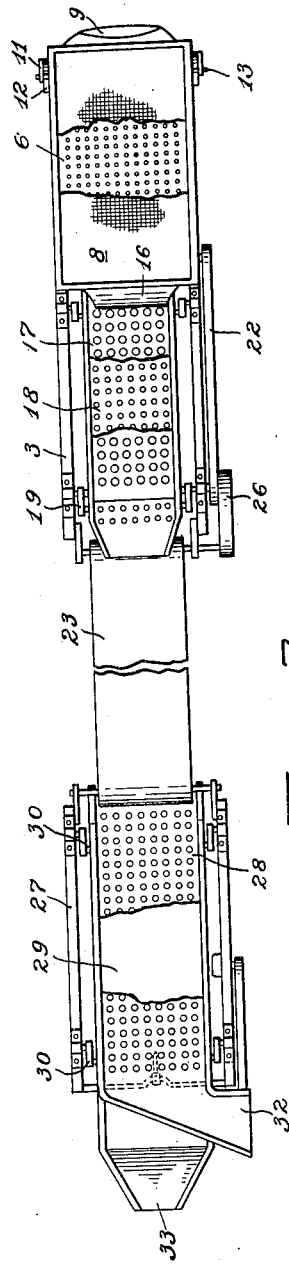
Fig-2-
INVENTOR.
ARVID M. ERICKSON.
BY Jas. M. Naylor
ATTORNEY Patented Aug. 29, 1933

1,924,111

UNITED STATES PATENT OFFICE 1,924,111

METHOD FOR STEMMING GRAPES

Arvid M. Erickson, San Jose, Calif., assignor to Barron-Gray Packing Company, San Jose, Calif., a Corporation of California Application May 24, 1932. Serial No. 613,242

5 Claims. (Cl. 146—219)

This invention relates to a method and apparatus for stemming fresh grapes in preparation for canning or preserving of same.

The invention has for one of its objects the provision of a method and means by which bunches of or unstemmed grapes may be treated to efficiently remove the majority of the stems therefrom, and thus materially reduce the cost of this step in the canning operation.

Another object of the invention is the provision of a method and means by which stems may be removed from the individual berries without unduly blemishing or rendering the same unsightly and thus unfit for the above-mentioned use.

The stemming of grapes has in the past presented a very perplexing economical problem in that no inexpensive method or apparatus has been known and it has been necessary, therefore, to employ such a large number of persons to pick the stems from the individual grapes as to render the cost of treating sizable quantities of this fruit almost prohibitive. The present invention was therefore developed to successfully treat a large quantity of the grapes, remove the stems from the greater percentage, and thus reduce the costs by making it necessary to hire only a few pickers to check over the work of the mechanical means employed.

Another object of the invention is the provision of a method which is designed to speed up the stemming operation as an aid to the canning of such fruits as grapes by avoiding spoilage caused by delay during the heat of the normal canning season.

For the purpose of describing the method and apparatus forming the subject matter of the present application, reference will be made to the accompanying drawing in which:

Figure 1 is a diagrammatic view of one form of apparatus which may be employed, and Figure 2 is a plan view of the same apparatus.

In the said drawing, the numeral 3 indicates generally a main frame supporting at one end a shaker box 4 and at the other a set of superposed trays 5.

The shaker box 4 consists of the perforate bottom 6 and the frame member 7 supporting the canvas walls and top 8. The bunched or unstemmed grapes are fed into the shaker box 4 through the opening 9 therein. One end of the shaker box 4 is mounted on the springs 10 while the other end rests upon the arm 11 connected eccentrically to the disk or wheel 12, the latter being mounted on the shaft 13. The shaft 13 is rotated by means of the belt 14 connected to a suitable means of driving, such as the motor 15. A discharge chute or spout 16 is provided at the rear or discharge end of the shaker box 4.

The superposed trays 17 and 18 are supported by the main frame 3, as stated, in such a position as to permit the former to catch the discharge from the shaker box 4. The trays 17 and 18 also have perforate bottoms to permit stems, leaves and other foreign matter to fall therethrough, as well as to sort out the berries which are too small for the purpose defined.

The said trays 17 and 18 are rockably mounted on the said frame 3 by means of the arms 19, and a reciprocal motion is imparted thereto by means of the pitman 20, connected to the crank shaft 21. The latter is rotated by the bolt 22 connected to the motor.

The lower tray 18 discharges onto the endless conveyor belt 23, running on the pulleys 24 and 25. The former is rotated by the belt 26 driven in turn by a pulley mounted on the shaft 21.

The second piece of apparatus, mounted on the frame 27, is substantially a duplicate of the above-described superposed trays 17 and 18, in that it is provided with similar trays 28 and 29, the former a perforate bottom to sift out any small grapes, stems, leaves or other foreign matter passing through the first part of the apparatus and over the belt 23. Likewise, it is rockably mounted within the frame 27 by means of the arms 30 and the pitman 31, driven by a suitable means such as that illustrated in Figure 1.

The upper tray 28 discharges the grapes to be canned by means of the chute 32 and the lower tray discharges collected refuse and discarded grapes by means of the chute 33.

In operation, my method takes the following steps:

The bunched or unstemmed grapes are fed into the shaker box which, as will be noted from the above description, has an up and down or jigging motion, wherein most of the grapes are shaken free of the bunches, and many of them are freed of the relatively short connecting stems. This first step is materially aided by the rubbing contact or frictional engagement the grapes have with the canvas walls and top of the shaker box, for the reason that the individual berries are rolled with relation to and freed of the bunches of which they had been a part.

The perforate bottom of the shaker box permits of the disposal of bits of stem, immature grapes and other small foreign matter, before the fruit passes forwardly for further treatment.

Passing from the shaker box to the upper tray 17, the grapes are subjected to additional agitation and rubbing action tending to further free the stems remaining thereon, by reason of the reciprocating motion imparted to the said trays by the pitman 20. The upper tray, because of the comparatively large perforations in its bottom, will pass the grapes destined for actual canning to the tray 18, and retain those which are too large for that purpose, in addition to large pieces of foreign matter.

The bottom of the tray 18 having relatively smaller holes therein than the bottom of tray 17, will retain all grapes delivered thereto of a size suitable for canning and yet further sift out immature fruit and smaller bits of foreign matter.

The motion of the superposed trays 5 being reciprocal, the grapes are caused to progress forwardly over the bottom of tray 18 to the conveyor or sorting belt 23 for inspection prior to final sorting. The sorting belt travels in the direction of the device composed of the trays 28 and 29, and in the apparatus I have constructed, a belt of sufficient length has been provided so that a number of persons may work over the fruit passing therealong to pluck off any stems remaining on the grapes discharged thereto from the tray 18.

Employing the method and apparatus I have defined and illustrated, it has been found that approximately 70% of the stems can be removed from the grapes handled, and that the remainder of the stems can be easily plucked by the operators working at the sorting belt. Thus my invention is an improvement over known methods and effects obvious economies in the proper preparation of fruits of this particular species.

While certain features of this invention are described and illustrated in a more or less detailed manner, it should be understood that various changes may be resorted to within the scope of the appended claims.

Having thus described my invention, what I claim and desire to secure by Letters Patent is:

1. A method of stemming grapes and like fruit which comprises the steps of first subjecting the fruit to a jigging motion while in contact with coarse fabric surfaces, and then subjecting the fruit to horizontal agitation while on a perforate surface.

2. A method of stemming grapes and like fruits which comprises the steps of first subjecting the fruit to a jigging motion while in contact with coarse fabric surfaces, and then subjecting the fruit to successive horizontal agitation while on perforate surfaces.

3. A method of stemming grapes and the like which comprises the steps of first subjecting the bunched and unstemmed fruit to a jigging motion while in contact with coarse fabric surfaces, and then subjecting the fruit to successive horizontal agitations while on a perforate surface.

4. A method of stemming grapes and the like which comprises the steps of first subjecting the bunched and unstemmed fruit to a jigging motion while in contact with rough surfaces, and then subjecting the fruit to successive horizontal agitations while on a perforate surface.

5. A method of stemming grapes and the like which comprises the steps of first subjecting the bunched and unstemmed fruit to a jigging motion while in contact with roughened surfaces, and then subjecting the fruit to successive horizontal agitations while on perforate surfaces.

ARVID M. ERICKSON.